United States Patent [19]

Rozenberg

[11] Patent Number: 5,736,087
[45] Date of Patent: Apr. 7, 1998

[54] METHOD FOR FINISHING OF SAUSAGE CASINGS

[75] Inventor: Alexander Rozenberg, Mogilev, Belarus

[73] Assignee: Alfacel s.a., Madrid, Spain

[21] Appl. No.: 741,315

[22] Filed: Oct. 30, 1996

[51] Int. Cl.⁶ .................................................. D01F 2/06
[52] U.S. Cl. ...................... 264/188; 264/38; 264/179; 264/180
[58] Field of Search ......................... 264/37, 38, 178 R, 264/179, 180, 181, 188, 189, 192, 196; 425/68, 72.1, 72.2

[56] References Cited

U.S. PATENT DOCUMENTS

| | | | |
|---|---|---|---|
| 604,206 | 6/1898 | Cross et al. . | |
| 1,036,282 | 8/1912 | Lilienfeld . | |
| 1,070,776 | 8/1913 | Cohoe et al. . | |
| 1,158,400 | 10/1915 | Cohoe . | |
| 1,163,740 | 12/1915 | Cohoe . | |
| 1,601,686 | 9/1926 | Henderson . | |
| 1,612,508 | 12/1926 | Henderson et al. . | |
| 1,645,050 | 10/1927 | Henderson . | |
| 1,654,253 | 12/1927 | Henderson . | |
| 2,352,519 | 6/1944 | Costa et al. | 264/38 |
| 2,364,407 | 12/1944 | Walker | 264/38 |
| 2,413,102 | 12/1946 | Ebert et al. | 264/188 |
| 2,514,471 | 7/1950 | Calhoun | 264/179 |
| 2,519,382 | 8/1950 | Kuljian | 264/38 |
| 2,659,102 | 11/1953 | Rarick | 264/180 |
| 2,683,072 | 7/1954 | Clark | 264/179 |
| 2,999,756 | 9/1961 | Shiner et al. . | |
| 2,999,757 | 9/1961 | Shiner et al. . | |
| 3,217,068 | 11/1965 | Drisch et al. | 264/179 |
| 3,835,113 | 9/1974 | Burke et al. . | |
| 4,520,520 | 6/1985 | Johnston et al. . | |
| 4,590,107 | 5/1986 | Bridgeford . | |
| 4,778,639 | 10/1988 | Jon et al. . | |
| 4,790,044 | 12/1988 | Kirchner et al. . | |
| 5,358,765 | 10/1994 | Markulin . | |

*Primary Examiner*—Mathieu D. Vargot
*Attorney, Agent, or Firm*—Marshall, O'Toole, Gerstein, Murray & Borun

[57] ABSTRACT

The present invention relates to improved methods for the regeneration of cellulosic artificial sausage casings including the steps of immersing the regenerating casing in at least one regeneration bath including a solution of sodium sulfate and sulfuric acid, and subsequently immersing the regenerated casing in at least one finishing bath to remove impurities from the regenerated casing and further including the steps of maintaining regeneration bath at a temperature greater than 80° C., sparging gas against the regenerating casing in said bath and actively cooling the regenerating casing upon withdrawal from the regeneration bath, spraying the regenerated casing with finishing solution above finishing bath and sparging gas against the regenerated casing in the finishing bath.

8 Claims, 2 Drawing Sheets

METHOD FOR FINISHING OF SAUSAGE CASINGS

The present invention relates to provision of a new, unique regeneration method for the production of tubular regenerated cellulosic (viscose) casings, including fibrous casings as well as non-fibrous, non-reinforced, viscose casings, normally referred to as skinless sausage casings. Specifically, the method provides improvements in the speed and economy of regeneration and finishing and in the efficiency of water usage and waste production associated with the regeneration and finishing of cellulosic casings.

Tubular cellulosic casing is well-known and has been widely used for many years by numerous manufacturers. The basic process for manufacturing regenerated cellulosic casings is through the well-known viscose process which creates a liquified colloidal dispersion of cellulose fibers in an alkaline liquid carrier. Viscose is described in English Patent 8700, Cross, Bevan and Beadle. Patents such as U.S. Pat. No. 1,036,282 to Lilienfield redefine the compositions. U.S. Pat. No. 1,070,776; U.S. Pat. No. 1,158,400; U.S. Pat. No. 1,163,740 to Cohoe and Fox describe use of viscose to manufacture a tubular cellulosic casing. Henderson provides basic technology to manufacture viscose into tubular casings with regenerating baths touching the inner and outer surfaces of the tube in U.S. Pat. No. 1,601,686; U.S. Pat. No. 1,612,508; U.S. Pat. No. 1,645,050 and U.S. Pat. No. 1,654,253.

Specific details for manufacture of modern day casings from viscose into regenerated cellulose are well known in the art and are described in references such as U.S. Pat. Nos. 2,999,756 and 2,999,757 to Shiner; U.S. Pat. No. 3,835,113 to Burke; U.S. Pat. No. 4,590,107 to Bridgeford; U.S. Pat. No. 4,778,639 to Jon; and U.S. Pat. No. 5,358,765 to Markulin. These references describe the basic process of extruding viscose (sodium cellulose xanthate, sodium hydroxide, water) through an annular die into a coagulating and regenerating bath which regenerates the extruded viscose to produce a cellulosic tubular casing.

The regeneration of cellulosic casing produces numerous contaminates which must be removed from the casing during regeneration and finishing of the casing. Such contaminants include residual cellulose xanthate which decomposes to cellulose and carbon bisulfide, sulfuric acid, sulfites, sodium sulfate, and sulfur. The rate of removal of such contaminants depends upon the difference in concentration of the said components present inside the casing film and upon its surface.

Finishing of the viscose films includes the steps of washing with water, desulfiding with alkali or sodium sulfite, and plasticization with the glycerol solution. According to prior art methods the regenerated casing passes through the number of baths and the said casing is immersed in baths filled with water or with other finishing solutions.

Prior art methods of regeneration and finishing comprise immersion of the casing into finishing solutions wherein the casing bears the contaminated solutions upon its surface. Due to the laminar flow of the regeneration and finishing solutions over the casing rapid diffusion of contaminates located deep in the film to the casing surface is prevented. As a consequence of such slow diffusion more finishing baths, more washing, slower line speeds and longer finishing lines are required.

A further limitation of prior art regeneration and finishing methods relates to the inflation of the casing in the initial regeneration stage where the casing is treated with solutions comprising the sulfuric acid needed for the complete decomposition of the residual xanthate. The sulfuric acid reacts to produce carbon bisulfide ($CS_2$) and hydrogen sulfide ($H_2S$) gas in the course of decomposition of the residual xanthate causing the casing to inflate as a consequence of the high temperatures of the finishing solutions. As a consequence, processing and transport of the regenerating casing is rendered onerous.

In order to minimize the problems associated with inflation of the casing with carbon bisulfide the upper rolls are generally placed in 1.5 to 2 meters above the level of the finishing solutions. Due to the passive cooling of the casing caused thereby the carbon bisulfide and hydrogen sulfide gases condense and the casing is flattened, which, in its turn, permits the normal operation of the finishing process.

Unfortunately, with increases in casing extrusion and line speeds the increase in height required to achieve adequate cooling is undesirable because it requires machine reconstruction and complicates machine servicing. Moreover, there still remain significant problems associated with the large quantities of water consumed and contaminated by the prior art processes. Such processes are characterized by water consumption of as much as 75 L/min or even greater depending upon speed per machine with the water consequently being contaminated with sulfuric acid and sodium sulfate.

Thus, there remains a desire in the art for viscose casing regeneration methods which provide improvements in the speed and economy of regeneration and finishing and in the efficiency of water usage and waste production associated with the regeneration and finishing of cellulosic casings.

SUMMARY OF THE INVENTION

The present invention provides methods and apparatus which function to accelerate the regeneration and finishing process in the production of viscose sausage casing by as much as two or three times. Further, the methods of the invention function to minimize water consumption during the regeneration and finishing process and minimize or eliminate waste production at the finishing step.

The present invention provides improved methods for the production of tubular sausage casings of regenerated cellulose. Specifically, the invention provides for improvements in methods for the regeneration of cellulosic artificial sausage casings comprising decomposition of residual xanthate and regeneration of cellulose comprising the steps of immersing the regenerating casing in at least one regeneration bath comprising a solution of sodium sulfate and sulfuric acid, and subsequently immersing the regenerated casing in at least one finishing bath to remove impurities from the regenerated casing. The improvement comprises the steps of maintaining the regeneration bath at a temperature greater than 80° C. and sparging gas against the regenerating casing in the bath and actively cooling the regenerating casing upon withdrawal from the regeneration bath. Further improvements of the invention relating to the finishing process include the steps of spraying the regenerated casing with finishing solution above a finishing bath and sparging gas against the regenerated casing in a finishing bath. According to one preferred aspect of the invention, the regenerated casing is immersed in a series of more than one finishing bath and finishing bath solution from a later finishing bath is used to spray the regenerated casing above a preceding finishing bath. Such a countercurrent washing arrangement provides for greater efficiency in water usage.

Methods of actively cooling the regenerating casing to condense the carbon bisulfide vapor and cause the deflation of the inflated casing include contacting the casing with temperature controlled gas which can be air or any other gas which has been sufficiently cooled. While liquids, and in particular those having the same composition as that which the casing is being finished in at the time, can be sprayed to cool the casing, it is preferred that the casings be sprayed with a temperature controlled gas. Another method contemplated by the invention involves the use of temperature controlled rollers lying above the regeneration bath(s) which chill the casings upon contact and thereby condense the carbon bisulfide vapor. Such rollers can have their temperatures controlled in any of a variety of manners well known to the art including through circulation of chilled fluid through the interior of the roller.

DETAILED DESCRIPTION OF THE INVENTION

Figure 1:
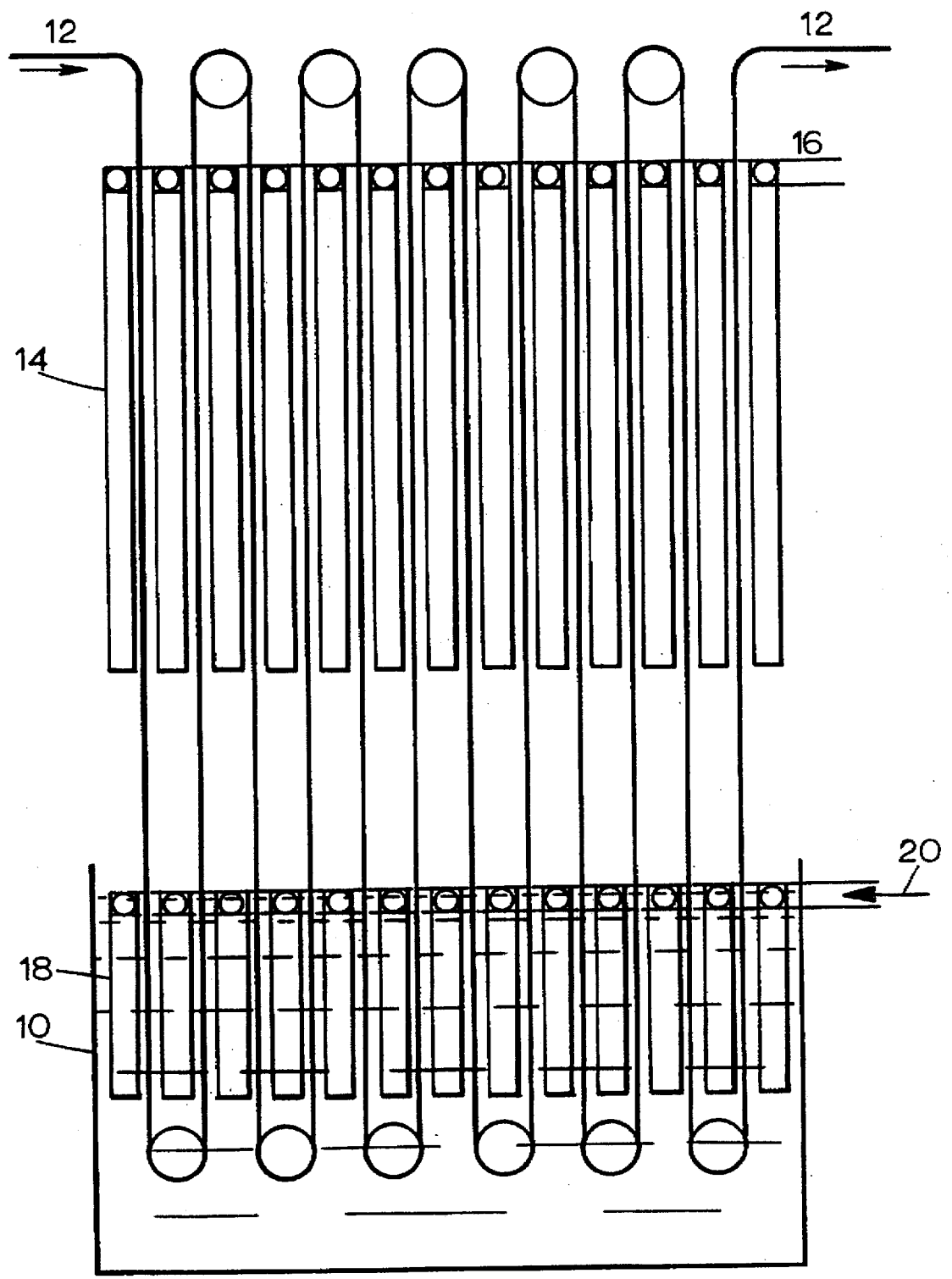
FIG. 1 depicts a generalized casing regeneration apparatus according to the invention.

The methods of the invention may be applied to any viscose regeneration and finishing system and will generally provide improvements in the speed and economy of regeneration and finishing and in the efficiency of water usage and waste production associated with the regeneration and finishing of cellulosic casings. According to the general methods of the invention one or more (preferably four) regeneration baths are used to complete the decomposition of xanthate and the regeneration of viscose. Each regeneration bath preferably comprises an identical regeneration solution comprising from 20 to 25 g/L sulfuric acid and from 200 to 250 g/L sodium sulfate which is preferably maintained at a temperature of from about 80° to 90° C. Regenerating viscose casing is conveyed into the baths by means of a series of rollers such as are well known in the art which successively immerse and withdraw the viscose casing from each regeneration bath. According to the present invention a gas such as air heated to 80° to 90° C. is sparged against the regenerating casings within the regeneration baths. Banks of gas jets such as are well known in the an are placed adjacent the path of the immersed casing for sparging hot air or gas onto the casing. According to one preferred aspect of the invention thirteen (13) banks of spray nozzles are disposed both above and below each regeneration bath. The banks of spray nozzles are preferably relatively flat manifolds wherein the total area of the nozzles is less than or equal to 75% of the inlet area such that equal pressure is provided over the perforated surface. Alternatively, any of a variety of perforated tubes or vessels could be used such as would be familiar to those of ordinary skill in the art. The sparged gas acts to break up the boundary layer of regeneration fluid adjacent the casing and speeds removal and transport of impurities such as carbon bisulfide, sulfur, sulfites and the like. Thus, the volume and velocity of gas required to provide optimum results can be readily determined by those of ordinary skill in the art.

According to another aspect of the invention, means for actively cooling the casing are disposed above the regeneration bath(s) in order to deflate the casing which has been inflated because of the generation of carbon bisulfide and hydrogen sulfide vapor as a consequence of the high temperature of the regeneration bath. Such means include means for contacting the casing with a temperature controlled gas such as banks of gas jets disposed above the level of the regeneration baths for cooling the casing and means such as temperature controlled rollers for cooling the casing by direct contact. Such cooling means may be used individually or in combination. The combination of a high temperature regeneration bath, sparged gas contacting the regenerating casing within the bath and cooling of the casing above the bath to condense carbon bisulfide and deflate the casing results in a highly efficient regeneration of the viscose casing which allows higher line speeds, a reduction in the usage of regeneration reagents and the use of fewer regeneration baths.

After completion of regeneration, the viscose casing is conveyed to one or more finishing baths. According to a preferred aspect of the invention, a series of five finishing baths are used in a countercurrent flow arrangement with respect to the direction of conveyance of the casing. Specifically, fresh finishing solution containing pure soft water and essentially 0 g/L sulfate ion is supplied to the last (fifth) finishing bath where the finishing solution is contacted with the regenerated casing and removes residual sulfate ions and other impurities. According to a preferred aspect of the invention, the finishing bath solution is supplied to the last finishing bath by means of a bank of sprayers disposed above the bath. The bath solution is sprayed onto the casing which is successively immersed and withdrawn from the finishing bath and drips from the casing into the bath. According to a further aspect of the invention, gas such as air is sparged onto the casing in the finishing baths by means of banks of gas jets such as are well known in the art placed adjacent the path of the immersed casing. The sparged gas acts to break up the boundary layer adjacent the casing and speeds removal and transport of impurities such as carbon bisulfide, sulfur, sulfites and the like.

From the last (fifth) bath the finishing solution which now comprises minor amounts of impurities removed from the casing is circulated by a pump to a bank of sprayers above the next-to-last (fourth) bath and the process of spraying and recirculation continues until the finishing solution reaches the first finishing bath containing a relatively high level of impurities (preferably higher than 60 g/L sulfate ion). The finishing solution from this first finishing bath may then be disposed of directly or may be subjected to vacuum evaporation, with the remaining solution being combined with the composition of the regeneration bath. According to such methods vacuum evaporation may be used to raise the concentration of sulfuric acid up to 150 g/L and sodium sulfate up to 330 g/L. The resulting solution may then be blended with the regeneration bath solution with the excess used to produce anhydrous sodium sulfate. In this manner waste streams subject to water treatment may be reduced or eliminated.

The countercurrent contacting of finishing solution with casing provides a rapid and highly efficient finishing method which minimizes water usage and waste production because the cleanest finishing solution contacts the cleanest casing and the finishing solution present in the first finishing bath which has the greatest level of impurities still has a substantial concentration difference from the casing which it is contacting and is thus still highly efficient at removing impurities from that casing. Moreover, the countercurrent nature of the process concentrates the impurities in one finishing bath (the first one) making subsequent treatment and disposal of the impurities more efficient.

EXAMPLE

FIG. 1 depicts one of four regeneration baths (10) according to one embodiment of the invention wherein each bath comprises a regeneration solution comprising from 20 to 25 g/L sulfuric acid and from 200 to 250 g/L sodium sulfate at a temperature of from 80° to 90° C. Casing (12) to be regenerated is conveyed above the bath and passes between banks of sprayers (14) fed by air supply line (16) which direct temperature controlled air chilled to a temperature of 10°–12° C. onto the casing. The casing is then repeatedly immersed and withdrawn from below the regeneration fluid level in the regeneration bath. When passing through the bath (10) the casing passes between banks of sprayers (18) fed by air supply line (20) which sparge air at a temperature of 80° to 90° C. onto the casing to break up the boundary layer at the surface of the casing and accelerate the rate of regeneration. In the course of regeneration carbon bisulfide is generated which becomes a vapor at the elevated regeneration bath temperatures and inflates the casing (12). The carbon bisulfide is then condensed by treatment with the chilled air such that the casing is deflated until it is subsequently reheated upon contact with the heated regeneration solution. After passing through six immersions in the regeneration bath the casing is then conveyed to the next regeneration bath where the process is repeated.

Figure 2:
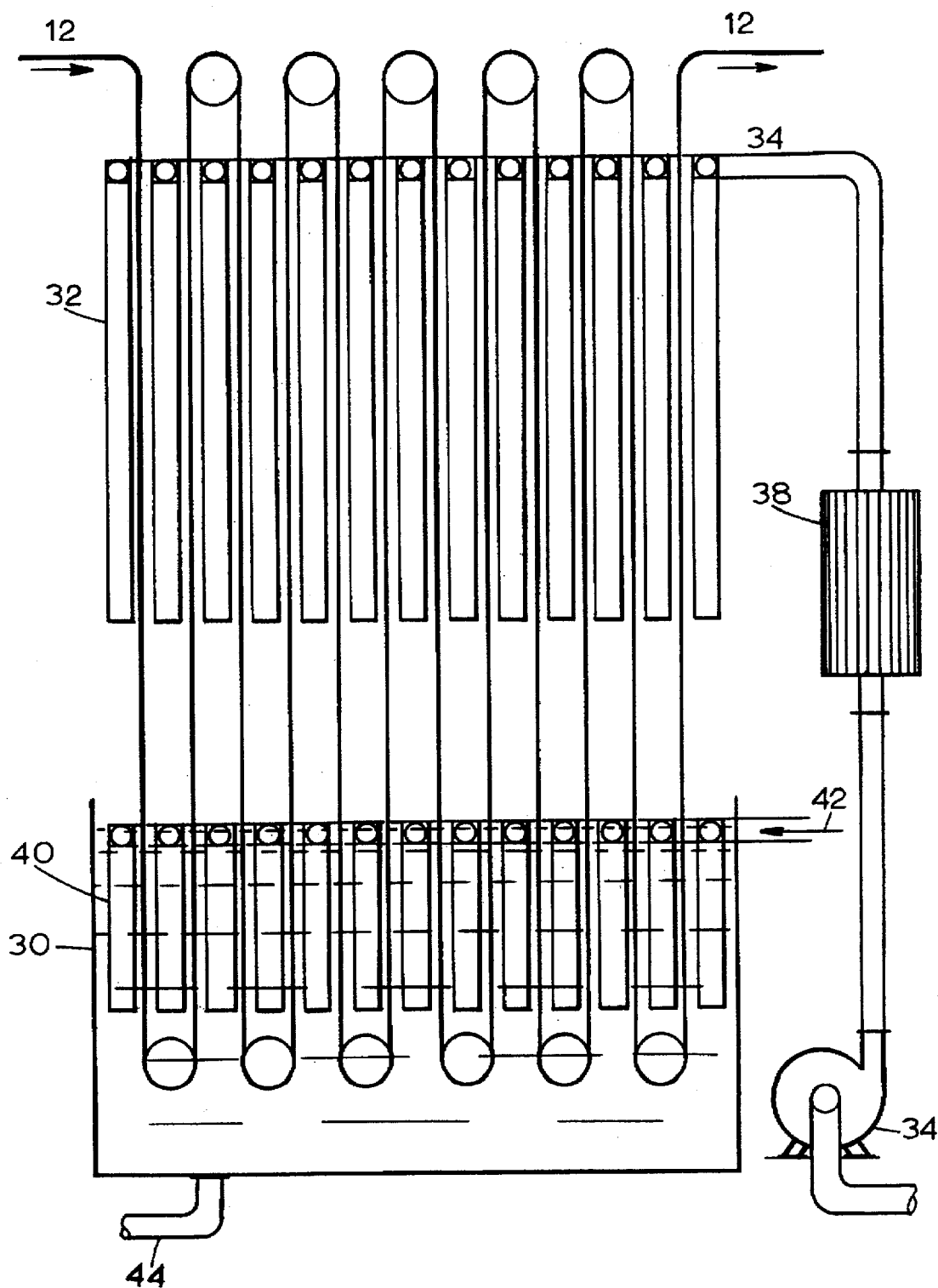
FIG. 2 depicts a generalized casing finishing apparatus according to the invention.

Upon being conveyed from the fourth and last regeneration bath the fully regenerated casing (12) is conveyed to the first of five finishing baths (30) such as depicted in FIG. 2. The casing passes between banks of sprayers (32) fed by supply line (34) which spray the casing with finishing solution supplied from the next finishing bath (not depicted) by means of a pump (36) and heat exchanger (38). These sprayers (32) shower the regenerated casing (12) with finishing solution and remove impurities from the casing. The casing is also immersed under the regeneration solution and passes through banks of sprayers (40) which are fed by air supply line (42) and sparge air onto the casing at a temperature of 35°-50° C. to disrupt the boundary layer adjacent the casing and accelerate the removal of impurities in the finishing process. After passing through six immersions in the finishing bath the casing is then conveyed to the next finishing bath where the process is repeated. Finishing solution containing impurities from the finishing bath (30) is removed through outlet (44) and is used to supply the sprayers (32) of the preceding finishing bath. This process continues until the sulfate ion concentration of the first finishing bath exceeds 60 g/L. Where the bath is the first finishing bath the bath solution comprising elevated levels of impurities is transported to means for vacuum evaporation or disposal as previously discussed. When the casing exits the fifth and final finishing bath it is transported to two additional baths wherein the casing is treated with a glycerol solution, and then the casing is to be dried off, rolled into the rolls in full accordance with methods well known in the art.

The results of the Example are compared with calculated and experimental results for conventional regeneration and finishing methods according to the prior art and are set out in Table 1 below. A comparison of the results demonstrates the superiority of the method of the invention with respect to water and equipment usage and with respect to speed of finishing and regeneration.

What is claimed is:

1. In methods for the regeneration of cellulosic artificial sausage casings comprising decomposition of residual xanthate and regeneration of cellulose comprising the steps of immersing the regenerating casing in at least one regeneration bath comprising a solution of sodium sulfate and sulfuric acid, and subsequently immersing the regenerated casing in at least one finishing bath to remove impurities from the regenerated casing the improvement comprising the steps of:

maintaining said regeneration bath at a temperature greater than 80° C. and sparging gas against the regenerating casing in said bath, and actively cooling the regenerating casing upon withdrawal from the regeneration bath.

2. The method of claim 1 wherein the regenerating casing is actively cooled by means of contacting the casing with temperature controlled gas.

3. The method of claim 1 wherein the regenerating casing is actively cooled by means of contacting the casing with temperature controlled rollers.

4. The method of claim 1 wherein the regeneration bath comprises from 20 to 25 g/L sulfuric acid and 200 to 250 g/L sodium sulfate.

5. In methods for the regeneration of cellulosic artificial sausage casings comprising decomposition of residual xanthate and regeneration of cellulose comprising the steps of immersing the regenerating casing in at least one regeneration bath comprising a solution of sodium sulfate and sulfuric acid, and subsequently immersing the regenerated casing in at least one finishing bath to remove impurities from the regenerated casing the improvement comprising the steps of:

spraying the regenerated casing with finishing solution above said finishing bath, and sparging gas against the regenerated casing in said finishing bath.

6. The method of claim 5 wherein the regenerated casing is immersed in a series of more than one finishing bath and finishing bath solution from a later contacted finishing bath is used to spray the regenerated casing above a preceding finishing bath.

7. The method of claim 5 wherein the first finishing bath is characterized by a concentration of sulfate ions greater than 60 g/L.

| Operation Description | Quantity of Baths | | Finishing Time, min. | | Water, L/min. | | Remarks | |
|---|---|---|---|---|---|---|---|---|
| | standard | new method | standard | new method | standard | new method | standard | new method |
| Complete Xanthate Decomposition | 4 | 4 | 3.8 | 3.8 | — | — | | |
| Casing Washing Off H2SO4, Na2SO4 | 14 | 5 | 13.5 | 4.7 | 75 | 24 | wastes | no wastes* |

*Complete regeneration of H2SO4 and Na2SO4, and their return to the production process.

Numerous modifications and variations in the practice of the invention are expected to occur to those skilled in the art upon consideration of the presently preferred embodiments thereof. Consequently, the only limitations which should be placed upon the scope of the invention are those which appear in the appended claims.

8. The method of claim 1 further comprising the steps of:
   spraying the regenerated casing with finishing solution above said finishing bath and
   sparging gas against the regenerated casing in said finishing bath.

* * * * *